W. E. CRIST.
LUBRICATOR FOR JOURNAL BOXES.
APPLICATION FILED JAN. 27, 1919.
1,337,201. Patented Apr. 20, 1920.
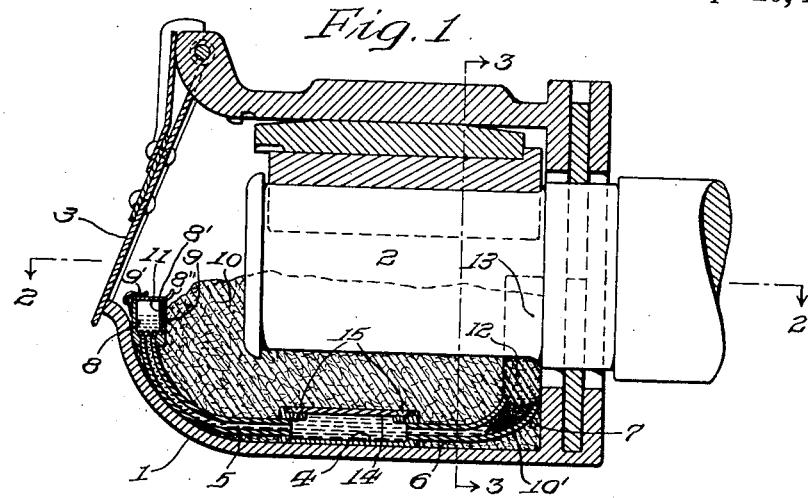
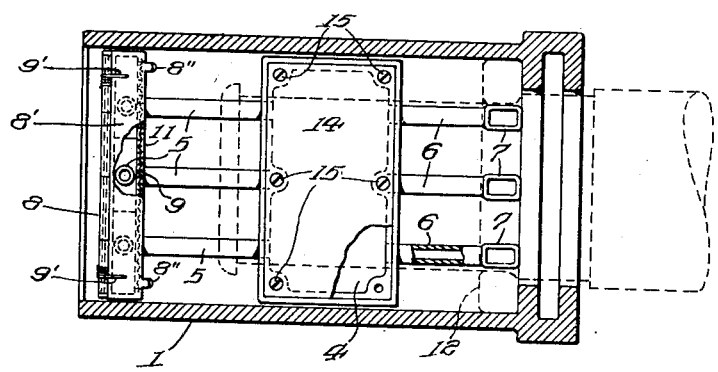
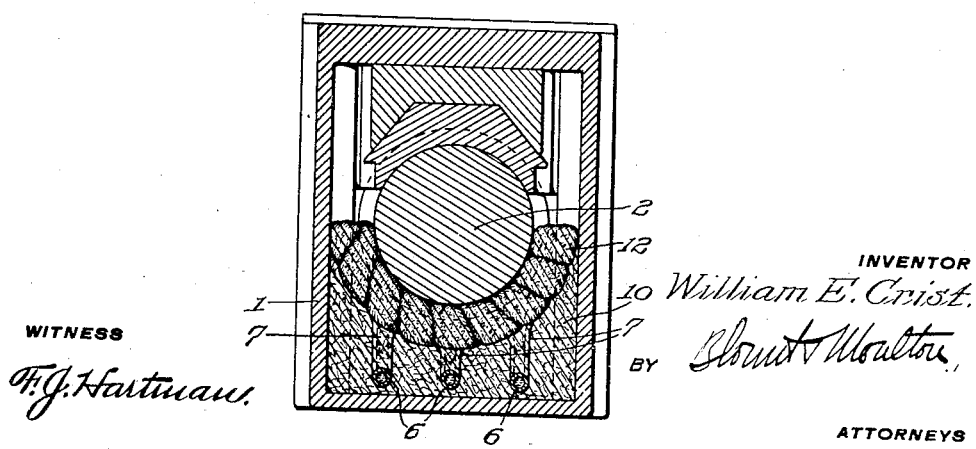
INVENTOR
William E. Crist.
WITNESS
F. J. Hartman.
BY
Blount & Moulton
ATTORNEYS

UNITED STATES PATENT OFFICE.

WILLIAM E. CRIST, OF BALTIMORE, MARYLAND.

LUBRICATOR FOR JOURNAL-BOXES.

1,337,201.

Specification of Letters Patent.  Patented Apr. 20, 1920.

Application filed January 27, 1919. Serial No. 273,263.

*To all whom it may concern:*

Be it known that I, WILLIAM E. CRIST, a citizen of the United States, and a resident of the city of Baltimore and State of Maryland, have invented certain new and useful Improvements in Lubricators for Journal-Boxes, of which the following is a specification.

This invention relates to lubricating devices for journal boxes which may be bodily inserted in the standard form of journal boxes presently in use without in any way altering the same, and comprehends the idea of maintaining a separate supply of lubricant which may be fed to a packing which will effectively and efficiently convey the lubricant to the part of the bearing more apt to be subjected to frictional heat than the rest of said bearing.

One of the objects of my invention is for the purpose of providing a means which will more efficiently and equally distribute the lubricant than devices heretofore utilized.

Another object is to so distribute the lubricant as to supply the same to the parts requiring the most.

Another object is to provide a means whereby greater efficiency of lubrication and greater economy of the lubricants may be obtained.

Another object is to so construct the device as to reduce to a practical minimum the frictional destructive effects that usually arise in journal boxes and to increase the life of the latter.

Another object of my invention is to include at the filleted part of the journal or bearing, a certain form of packing which will so coöperate with the feeding portion of the lubricating means as to effectively convey the lubricant to that part of the journal.

Another object is to so construct the invention as to impart to the lubricant therein a motion or movement arising from the motion of the journal box or vehicle in aid of feeding said lubricant to the packing referred to above.

Other objects, such as reduced cost in operation, as well as economy in the cost of materials and maintenance, are obtained by the use of this invention.

Such other objects and advantages as may arise in the invention disclosed will appear from the following disclosure, and in the appended claims.

In the accompanying drawings forming a part of this specification, Figure 1 is a vertical longitudinal section through the journal box and the lubricating means;

Fig. 2 is a horizontal section through said journal box on the line 2—2 of Fig. 1 and a top plan view of the contained lubricating means; and Fig. 3 is a transverse section of the journal box and of the lubricating means taken on lines 3—3 of Fig. 1.

Referring more particularly to the drawings wherein the same reference characters designate the same parts throughout the various views, the journal box 1, of standard type, is shown mounted upon the journal 2, and provided with the usual form of door 3. The lubricating device, constituting the invention herein disclosed, is bodily inserted within the lower compartment of the journal box and comprises a closed lubricant reservoir 4, which rests upon the bottom of the journal box 1 and is provided at a side thereof with inlet tubes 5 which communicate therewith at one end thereof and which are bent upwardly at the other ends to a short distance from the door 3 of the journal box. The lubricant reservoir is also connected at the other side thereof with the feed conduits 6, communicating at an end thereof with said reservoir and formed at the other end thereof with the open flared portions 7. These flared portions extend upwardly at different heights, as shown in Fig. 3, and are so formed as to conform to the shape of the packing to be used in connection therewith as is more fully disclosed hereinafter. At the upper end of the inlet tubes is situated an elongated receiving trough 8, the bottom of which is undulated, and is connected, at the lowest points thereof, to and in communication with the ends of said tubes. This receiving trough is provided on the inner side thereof with an opening 11 in which is inserted a filtering medium, such as a gauze 9, through which oil or any other form of lubricant, may be introduced into the journal box upon the surface of the waste 10, may flow through said gauze into the receiving trough, thence to the inlet tubes 5, the reservoir 8, and the feed tubes 6. The gauze acts also as a strainer for the oil in order that foreign matter will not be conducted to the reservoir. The open top of the receiving trough is normally closed by a door 8', of any suitable form, which may be held closed by means of a spring 9'. Finger lugs 8'' may be provided at the ends of this door whereby the same may be opened by hand when desired.

At the rear end of the journal box is provided a special form of packing 12 and, as shown, is in a twisted form and is located so as to bear against the open flared portions 7 of the feed conduits 6, with sufficient pressure whereby any loss of lubricant past this packing into the waste will be avoided, and the filleted portion of the bearing surface 13 of the journal proper. This packing may be of any suitable material which has the capillary property of conveying a suitable lubricant from the conduit tubes to the filleted portion of the bearing referred to above. If desired, the flared portions may have capillary material, such as waste 10', located therein in aid of conveying the lubricant to the packing 12 whenever the lubricant level becomes low in the reservoir and tubes. The usual waste packing 10 is also provided in the box beneath the bearing between said twisted packing and the front end of the box. This waste is packed tightly into place and serves the purpose, in addition to its lubricant applying function, to hold the lubricating device in position and from movement in said journal box. The lubricant reservoir 4 is provided as shown, with a suitable closure means or cover 14 which may be secured to the reservoir body by any appropriate securing means, as screws 15.

The device may be made of any material, such as metal, suitable for the purposes disclosed, and may possess such resiliency as may be required for it to properly and snugly fit in a standard type of journal box and yield to conform to whatever varying conditions that may arise therein.

In use, the lubricating means forming the subject-matter of my invention and which constitutes a self-contained and unitary device, is bodily inserted within the journal box so as to place the reservoir upon the bottom wall of the journal box with the inlet tubes and the flared portions of the feed conduits projecting upwardly above the level of said container. The receiving trough and the ends of the receiving tubes are located at a higher level than the flared portions of the feed conduits so that the lubricant may flow to the latter by gravity. The journal box may be otherwise packed with the usual form of packing, which generally is cotton waste or the like, and is generally introduced between the lower side of the journal and the lower wall of the box, and, in this case, this packing is introduced beneath the journal and around the various parts of the device inserted in the journal box in order to maintain the same in place. The packing 12 is generally first introduced, at the rear end of the box against the fillet portion of the journal, and in such a manner that the packing will bear with requisite pressure against the flared ends of the feed conduits themselves for the purposes mentioned. In order to fill the receiving trough with a lubricant, the latter may be poured or otherwise placed into the main chamber of the journal box, and as the oil flows over the surface of the waste 10, it will also flow through the gauze 9 into the trough, thence to the inlet tubes 5, the reservoir container 4 and feed tubes 14 into contact with the packing 12, the gauze, in the meanwhile, straining whatever oil passes therethrough. The lubricant may also be introduced into the opening at the top of the trough whenever desired, the door 8' being opened by hand for that purpose. The packing 12 will act, very much in the way that a wick functions, to absorb oil from the end of the feed conduits and to carry the same into contact with the portion of the bearing requiring a greater supply of the lubricant than what would be supplied by the ordinary cotton waste packing.

While I have shown one form of means embodying my invention, I do not wish, however, to be limited to the particular structure shown and described, but such other devices as may come within the scope of the appended claims, may also be utilized.

Having thus described the nature and objects of my invention, what I claim as new and desire to secure by Letters Patent is:

1. In lubricating devices for journal boxes, the combination of a lubricant reservoir located in the lower part of the journal box, a feed conduit leading from said reservoir to a packing means provided at an end of the bearing portion of the journal, and a supply conduit leading to said reservoir.

2. In lubricating devices for journal boxes, the combination of a closed lubricant reservoir located in the lower part of the journal box, inlet tubes communicating with said reservoir, feed conduits communicating with and leading from said reservoir to packing means located at an end of the bearing surface of the journal, and means provided at the inlet ends of the inlet tubes for filtering the lubricant supplied to said tubes, reservoir and conduits.

3. In lubricating devices for journal boxes, the combination of a closed lubricant reservoir located in the lower part of the journal box, curved inlet tubes communicating with said reservoir, curved feed conduits communicating with and leading from said reservoir to packing means provided between the open ends of said feed conduits and an end of the bearing surface of said journal, and filtering means for filtering the lubricant supplied to said inlet tubes.

4. In lubricating devices for journal boxes, the combination of a closed lubricant reservoir located in the lower part of the journal box, upwardly curved inlet tubes communicating with said reservoir, curved feed conduits communicating with and leading from said reservoir to packing means provided between the open ends of said feed conduits and an end of the bearing surface of said journal, said inlet tubes located at a higher level than said feed conduits, and filtering means for filtering the lubricant supplied to said inlet tubes.

5. In lubricating devices for journal boxes, the combination of a closed lubricant reservoir located in the lower part of the journal box, upwardly curved inlet tubes communicating with said reservoir, upwardly curved feed conduits provided with flared portions communicating with and leading from said reservoir to packing means provided between the open ends of said feed conduits and an end of the bearing surface of said journal, and filtering means for filtering the lubricant supplied to said inlet tubes.

6. In lubricating devices for journal boxes, the combination of a closed lubricant reservoir located in the lower part of the journal box, upwardly curved inlet tubes communicating with said reservoir, upwardly curved feed conduits provided with flared portions of different lengths communicating with and leading from said reservoir to packing means provided between the open ends of said feed conduits and an end of the bearing surface of said journal, and filtering means for filtering the lubricant supplied to said inlet tubes.

7. In lubricating devices for journal boxes, the combination of a lubricant reservoir located in the lower part of the journal box, a feed conduit leading from said reservoir to a packing means provided at an end of the bearing portion of the journal, a receiving trough provided with an opening in the top and in a side thereof, a door adapted to close said top opening and a supply conduit leading to said reservoir.

8. In lubricating devices for journal boxes, the combinatiton of a lubricant container located in the lower part of the journal box and extending from a point near the main opening of the journal box to a point adjacent one end of the journal thereby providing for a free passage of lubricant to said latter point, a strip of packing at said latter point between the end of said container and the end of said journal and a loose packing of a different quality interposed between said container and the main portion of said journal and adapted to hold said container firmly in place.

9. In a lubricating device for journal boxes, the combination of a lubricant container located in the lower part of the journal box, packing means therein, a curved inlet channel leading to the body of said container at one end thereof and an outlet means at the other end of said container, and independent packing means provided between said outlet means and the journal of the journal box, whereby lubricant may be supplied therethrough to said journal of the journal box.

10. In lubricating devices for journal boxes, the combinatiton of a closed lubricant container located in the lower part of the journal box, a curved inlet channel communicating with said container, a curved channel communicating with and leading from said container, packing means provided between said open end of said last mentioned channel and an end of the bearing surface of said journal, and filtering means for filtering the lubricant supply to said channel.

In witness whereof I have hereunto set my hand this 22d day of January, 1919.

WILLIAM E. CRIST.